No. 11,786. PATENTED OCT. 10, 1854.
E. N. HORSFORD.
REMOVING CHLORIN FROM FABRICS, &c.
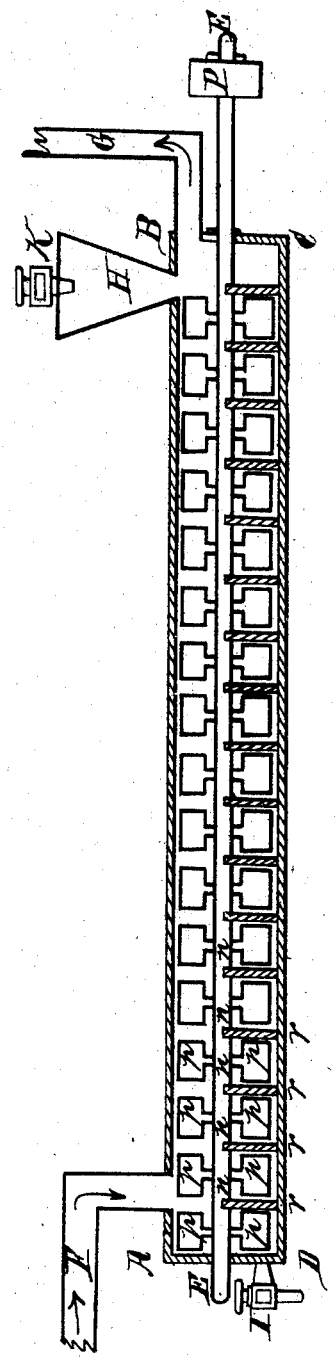

UNITED STATES PATENT OFFICE.

E. N. HORSFORD, OF CAMBRIDGE, MASSACHUSETTS.

COMPOUND FOR NEUTRALIZING CHLORIN.

Specification of Letters Patent No. 11,786, dated October 10, 1854.

*To all whom it may concern:*

Be it known that I, EBEN NORTON HORSFORD, of Cambridge, in the county of Middlesex, in the State of Massachusetts, have invented a new and Improved Mode of Removing Chlorin from Substances and Fabrics; and I do hereby declare that the following is a full and exact description thereof.

It is well known that sulfurous acid is an agent, which on coming in contact with chlorin or hypochlorous acid in water, is instantly converted into sulfuric acid. This property has been taken advantage of to neutralize the surplus chlorin in bleached substances and fabrics. Various preparations of sulfurous acid have been used, all of which are more or less inconvenient and objectionable. The bi-sulfite of soda has been employed for this purpose, and patented by Mr. Roth of Philadelphia. This article must be retained in the liquid form, is comparatively expensive, inconvenient of transportation and offensive to use.

I have devised a preparation of sulfurous acid which has the advantage of being comparatively cheap, easy of transportation, utterly without odor, as readily handled as gypsum, but very sparingly soluble in water, and yet of such nature that in the presence of bleaching salt (chlorid of lime) it will immediately act as an energetic reducing agent, and after its action remain an entirely neutral and harmless compound. This article may be prepared by various methods. I prefer the following, by which, with the arrangement described below, in a day of ten hours, a ton may be readily made.

A horizontal wooden box of one and a half feet square area, and sixteen feet long, is divided through the lower half into equal spaces of ten inches in length, by partitions rising from the bottom to a height of eight inches. Loosely fitting to these spaces will be paddles connected by arms to a shaft extending from end to end of the box. This shaft will be revolved by power applied at either extreme. Through a faucet on the top near the end communicating with the draft, milk of lime will be permitted to enter, from a tub in which it is kept in agitation, and through another faucet near the other extreme of the box, the lime saturated with sulfurous acid, will be permitted to pass out. It will be the care of the person in charge to see that the milk of lime when it issues shall have a neutral or acid reaction, this being the evidence of perfect saturation.

In the annexed drawing A, B, C, D, represents a vertical section of a rectangular wooden box having an aperture for the reception of sulfurous acid gas through the tube F another for the reception of milk of lime through the cock K and the funnel H another connecting with a chimney G and another through the cock I, for the escape of the saturated milk of lime.

E, E is a wooden shaft revolved by belting passing around the pulley P and connected with the paddles $p, p, p$, &c.

$r, r, r, r$, &c. are partitions rising to half the depth of the interior space of the box, notched at $n, n, n$, &c, for the shaft E, E. The cock at J being closed the milk of lime is permitted to flow in until the box is nearly half filled when the cock at K is closed and the sulfurous acid gas emitted to come in and the shaft and paddles set in motion. As soon as the liquid at I proves, by test paper, to be saturated with sulfurous acid the cock I is permanently set open to let the milk pass out and the cock at K to let other and fresh milk of lime pass in. The process then becomes continuous.

A surface of burning sulfur of three and a half feet by two feet, will be adequate to the supply of the requisite quantity of sulfurous acid. This for a ton will be 533 lbs. As the saturated lime milk issues from the trunk it may be received on cloth filters or in baskets with cloth lining, which will permit the water to drain readily away. The contents of these filters or baskets may then be emptied on plane surfaces to dry, from which they will after drying be packed in barrels or boxes for convenient transportation. I do not propose to restrict myself to any particular method of perforation.

The article so prepared and which I denominate "anti-chlorid of lime", may for removing chlorin from bleached halfstuff in paper manufacture, be added directly to the contents of the engine in small quantities repeatedly stirred up with water, until the presence of free chlorin is no longer perceptible by the usual tests.

The composition of the "anti-chlorid of lime" is $CaO.SO_2$—a neutral sulfite of lime. The rationale of its action is this: an acid (hydrochloric acid for example) converts the insoluble neutral sulfite into the soluble bi-sulfite of lime thus $2(caoSO_2)+Hle = cale+cao2SO_2)+HO$, which is equivalent in its action to free $SO_2$ in solution in water. Chlorin in the presence of water converts sulfurous acid into sulfuric acid thus $SO_2+HO+Ce=SO_3+Hce$ which, in the presence of the chlorid of calcium gives sulfate of lime and free hydrochloric acid, which again in turn gives solubility to another atom of sulfate of lime, $cacl+SO_3+HO=cao,SO_3+Hle$.

For removing chlorin from bleached cotton or linen fabrics they should be passed as they come from the bleaching liquor, through water slightly acidulated, and containing the anti-chlorid of lime in suspension; and for neutralizing chlorin generally, the article from which it is desired to remove the chlorin, should be passed through slightly acidulated water containing the anti-chlorid of lime in suspension.

I claim—

The process of neutralizing chlorin by means of the substance herein described and called anti-chlorid of lime.

In witness whereof I have hereunto subscribed my name the first day of June, eighteen hundred and fifty four.

E. N. HORSFORD. [L. S.]

In presence of—
 L. HOFFMANN,
 C. H. RICHARDSON.